INVENTOR
ROY T. ARNOLD
BY
ATTORNEY

INVENTOR.
Roy T. Arnold
BY
ATTORNEY

United States Patent Office 3,320,522
Patented May 16, 1967

3,320,522
SUPERCONDUCTIVE FLUX MAGNIFIER
Roy T. Arnold, Clearwater, Fla., assignor to Sperry Rand Corporation, Great Neck, N.Y., a corporation of Delaware
Filed June 18, 1963, Ser. No. 288,698
4 Claims. (Cl. 324—43)

The present invention generally relates to devices for increasing the level of incident flux and, more particularly, to a superconductive flux magnifier for increasing the level of static magnetic fields.

Flux magnification is a technique which is particularly useful for extending the sensitivity of magnetometers. That is, where the level of a magnetic field to be measured is beneath the sensitivity threshold of a given magnetometer, the threshold can be effectively reduced by magnifying the flux to be measured by a known amount and then measuring the magnified flux.

One object of the present invention is to provide a superconductive devise for magnifying the level of a static magnetic field.

Another object is to provide a superconductive flux magnifier characterized by structural simplicity and reliability.

Another object is to provide a superconductive flux magnifier wherein the amount of magnification can be controlled readily.

These and other objects of the present invention are achieved in a preferred embodiment by the provision of a superconducting circuit comprising a pick-up coil, a storage coil and two switches. The switches are made normally conducting or superconducting in accordance with a predetermined sequence. One of the switches is placed in series circuit with the pick-up coil and the storage coil. The other switch is connected in shunt with the storage coil. When the first switch is made superconducting, a first superconducting closed current path is formed by the first switch, the pick-up coil and the storage coil. When the second switch is made superconducting, a second superconducting closed current path is formed by the second switch and the storage coil. With the exception of the pick-up coil, the entire superconducting circuit is shielded from external fields by a superconducting magnetic shield.

Means are provided for admitting the external field flux to be magnified into the pick-up coil at certain times and for shielding the pick-up coil from said flux at other times in a special sequence relative to the operation of the first and second switches. In particular, first the flux is admitted and then the first switch is made superconductive. When the flux subsequently is expelled from the pick-up coil, a persistant current flows in the superconducting current path comprising the pick-up and storage coils and the first switch. The persistent current is generated in order to satisfy Faraday's law for superconducting loop, i.e., to maintain the flux over the superconducting circuit constant. The current is of such a magnitude and direction to maintain a flux over the superconducting loop identical to the flux expelled from the pick-up coil.

The first and second switches are cycled so as to divert (trap) the current into a second superconducting closed current path comprising the storage coil and the second switch. Then, the flux again is admitted to the pick-up coil and the first switch is restored to its superconducting state whereupon the cycle of the flux expulsion and current trapping is repeated. Each complete cycle of operation produces an addition to the trapped current which is somewhat less than the addition made at the completion of the immediately preceding cycle. The result is that the trapped current increases in stepwise fashion with each succeeding step being of decreased amplitude until a limiting or maximum value of current is trapped. The trapped current has associated with it a "trapped flux" whose magnitude increases in stepwise fashion with the amplitude increases of the trapped current. The energy required for the flux trapping procedure is derived from the means which admits and expels the flux being measured. No energy is extracted from the flux being measured. The flux magnifier may be calibrated to produce predictable degrees of magnification as a function of the number of flux trapping cycles completed.

In a preferred form of the present invention, the admission and expulsion of the flux from the pick-up coil is accomplished by rotating the pick-up coil within the flux field in a special synchronous manner relative to the operation of the first and second switches. The special manner provides for a maximum of trapped current upon the completion of each cycle of operation.

For a more complete understanding of the present invention, reference should be had to the following specification and to the appended figures of which:

Figures 1, 3:
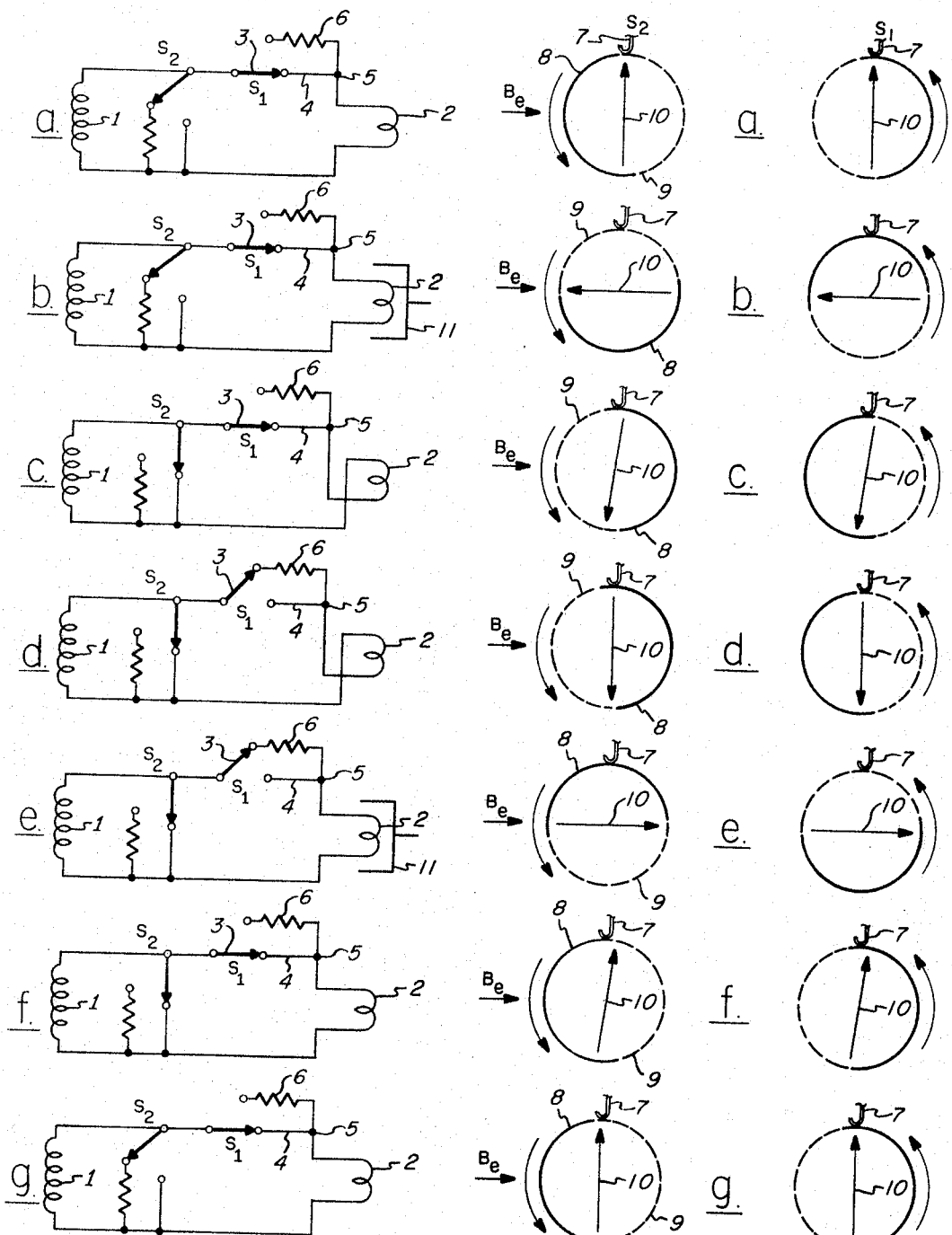
FIG. 1 is a series of simplified circuit diagrams of the preferred embodiment depicting the sequence of operations of the first and second switches relative to the admission and expulsion of the flux being measured.
FIG. 3 is a series of diagrams depicting the manner in which the first and second switches are cycled between their normally conducting and superconducting states.

Referring to FIG. 1, the flux magnifier of the present invention basically comprises a storage coil 1, a pick-up coil 2, and two switches $S_1$ and $S_2$ which may be made normally conducting or superconducting in a predetermined sequence. In the case of FIG. 1a, switch $S_1$ is in its superconducting state (zero resistance condition) whereas switch $S_2$ is in its normally conducting state (high resistance condition). The two states are schematically represented by the position of the movable arm. Thus, movable arm 3 is shown directly connected by a zero resistance line 4 to terminal 5. In FIG. 1d, on the other hand, the movable arm 3 of switch $S_1$ is connected by resistor 6 to terminal 5. Accordingly, switch $S_1$ is said to be in its superconducting state in FIG. 1a and in its normally conducting state in FIG. 1d. The same convention is followed for both switches $S_1$ and $S_2$ throughout all of the diagrams comprising FIG. 1.

The series of diagrams comprising FIG. 3 also indicate the normally conducting and superconducting state of switches $S_1$ and $S_2$ but in a manner more descriptive of the actual structure employed in the preferred embodiment. As will be discussed in more detail later, each switch comprises a stationary wiper such as wiper 7 of switch $S_2$ which contacts a rotating annular member having a superconducting portion such as portion 8 and a normally conducting portion such as portion 9. When the wiper is in contact with the normally conducting portion, the switch is in its normally conducting state. This is the case, for example, with the representation of switch $S_2$ in FIG. 3a. Conversely, the switch is in the superconducting state when the wiper contacts the superconducting portion as in the FIG. 3a showing for switch $S_1$.

Pick-off loop 2 is rotated in synchronism with the annular members of switches 1 and 2. The successive planes of the pick-up loop are represented in the diagrams of FIG. 3 by the arrows 10. The magnetic field to be magnified by the apparatus of the present invention is represented by the vector $B_e$.

With switch $S_1$ in its superconducting state and switch $S_2$ in its normally conducting state, as shown in FIG. 1a and in FIG. 3a, a superconducting closed current path is formed comprising storage coil 1, switch $S_1$ and pick-up loop 2. In accordance with the present invention, the magnetic field to be magnified is admitted to pick-up loop 2 before switch $S_1$ is made superconducting. Then, switch $S_1$ is made superconductive but the current remains zero in the superconducting loop. The situation is shown in FIG. 3a wherein the plane of the pick-up loop (represented by arrow 10) is perpendicular to the incident magnetic field $B_e$, the wiper of switch $S_2$ contacts the normally conducting portion (dotted line portion) of the respective annular member and the wiper of switch $S_1$ contacts the superconducting portion (solid line portion) of the respective annular member.

Assuming that the annular switch members and the pick-up loop rotate synchronously in the indicated counterclockwise direction, the relationships depicted in FIG. 1b and FIG. 3b are reached upon a 90° counterclockwise angular displacement. As shown in FIG. 1b and FIG. 3b, switches $S_1$ and $S_2$ remain in the superconducting and normally conducting states, respectively. The plane of the pick-up loop, however, has rotated so as to present a zero cross-sectional area to the magnetic field $B_e$. This relationship of the loop to the field causes the expulsion of the magnetic field flux from the pick-up loop as though a superconducting magnetic shield such as shield 11 were placed about pick-up loop 2 as suggested in FIG. 1b. Upon the expulsion of the magnetic field $B_e$ from the pick-up coil 2 during the rotation of the plane of the pick-up loop from the position indicated in FIG. 3a to the position indicated in FIG. 3b, a persistent current is caused to flow in the superconducting current loop having a magnitude sufficient to maintain the flux constant over the superconducting current loop comprising storage coil 1, superconducting switch $S_1$ and pick-up coil 1.

Figure 2:
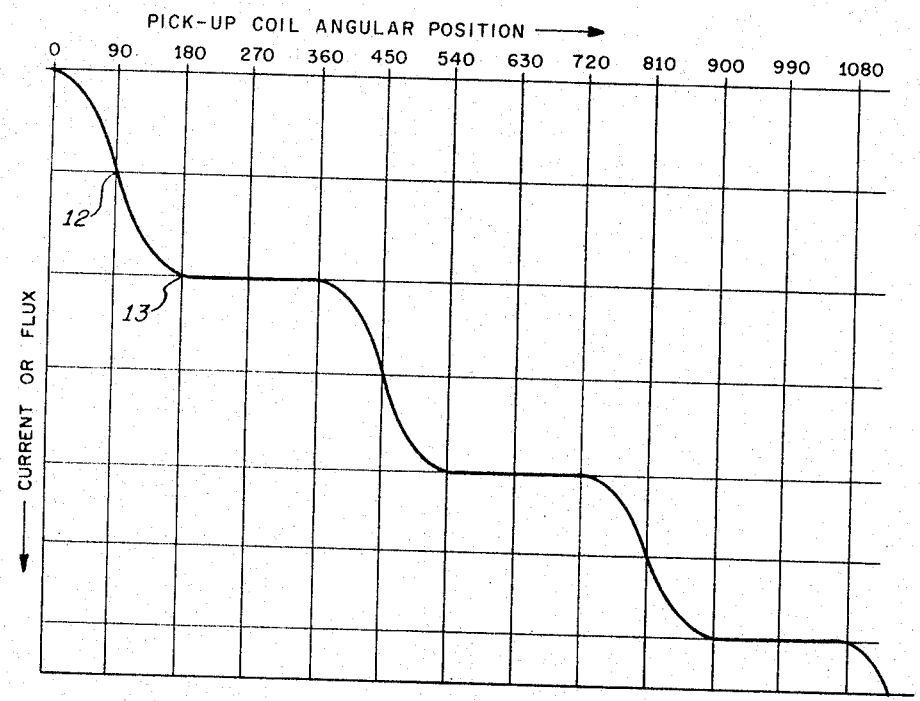
FIG. 2 is a plot of the current or flux generated within a superconducting closed current path as a function of the cumulative angular position of the sensing coil used in the preferred embodiment.

A plot of the superconducting loop current as a function of the angular displacement of the pick-up coil 2 is shown in FIG. 2. The superconducting loop current is zero when the angular displacement of the pick-up coil is as previously described in connection with FIG. 1a and FIG. 3a. As the pick-up loop is angularly displaced through 90° as shown in FIG. 1b and in FIG. 3b, the superconducting loop current increases from zero to the value at point 12 in FIG. 2.

When the pick-up coil continues to rotate beyond the 90° point, the cross-sectional area of the pick-up coil presented to the magnetic field $B_e$ increases from the zero value which occurred at the 90° displacement point. At the same time, however, the sense reverses in which the flux threads the pick-up coil as the pick-up coil travels through its null position. This is shown in FIG. 1c by the reversed connections of pick-up coil 2 relative to the superconducting current loop. Said reversal causes the persistent current flowing within the superconducting loop to increase further in order to satisfy Faraday's law for superconducting circuits, that the flux over the superconducting circuit remain constant. Thus, the current in the superconducting loop increases from the value at point 12 toward the value at point 13 in FIG. 2.

Slightly before the plane of the pick-up coil has rotated a full 90° from the position indicated in FIG. 3b, switch $S_2$ becomes superconducting while switch $S_1$ remains superconducting. This is shown in FIG. 3c. It should be noted that there is no change in the current flow because switch $S_2$ has become superconducting. The same current flowing in the superconductive loop of FIG. 1b continues to flow through storage coil 1, switch $S_1$ and pick-up coil 2 when the circuit of FIG. 1c is established. Any current tending to flow through the superconducting switch $S_2$ in FIG. 1c also would tend to alter the flux over the superconducting circuit comprising coils 1 and 2 and switch $S_1$. In order to satisfy Faraday's law for a superconducting circuit, therefore, no current flows through switch $S_2$ in FIG. 1c.

The flux associated with the current flowing through the superconducting circuit of FIG. 1c is apportioned between coils 1 and 2 in accordance with the relative magnitudes of the inductances. Assuming, for the sake of simplicity, that the inductance of storage coil 1 is ten times the inductance of pick-up coil 2, 10 units of flux thread coil 1 and one unit of flux threads coil 2.

Upon the slight additional angular displacement of the pick-up coil 2 from the position shown in FIG. 3c to the position shown in FIG. 3d, the plane of the pick-off coil becomes displaced a full 180° from its initial position in FIG. 3a. At the same time, switch $S_1$ becomes normally conducting while switch $S_2$ remains superconducting. The current flowing through the storage coil continues to flow around the superconducting loop comprising coil 1 and switch $S_2$ in an amount sufficient to maintain constant the 10 units of flux threading the storage coil. Thus, 10 flux units of the 11 flux units originally stored in the circuit of FIG. 1b is diverted to the storage coil loop in FIG. 1d. On the other hand, the current flowing in pick-up coil 2 falls to zero after switch $S_1$ has switched to its normal conducting state. The one unit of flux associated with pick-up coil 2 also reduces to zero. To briefly sum up the operation to this point, it may be said that 11 units of flux (equalling the assumed magnetic field $B_e$) originally is stored within a superconducting current loop wherein the 11 parts are apportioned between the storage coil and pick-up coil. Then the superconducting loop is reformed into two superconducting loops, one loop including the storage coil and the other loop including the pick-up coil. Lastly, the pick-up coil loop is made normally conducting whereupon only the 10 units of flux associated with the storage coil remains stored in the superconducting storage loop.

Inasmuch as switch $S_1$ remains in its normally conducting state and switch $S_2$ remains in its superconducting state during the next 90° angular rotation of the pick-up coil 2 as represented in FIG. 1e and FIG. 3e, no change takes place in the magnitude of the flux trapped within the storage loop. As the plane of the pick-up loop continues to rotate through and beyond the position shown in FIG. 3e, the cross-sectional area presented by the loop to the magnetic field $B_e$ begins to increase again. This permits the magnetic field to thread the pick-up coil 2.

Upon the further counterclockwise rotation to the position shown in FIG. 3f, switch $S_1$ changes from its normally conducting to its superconducting state. No current flows in pick-up coil 2 as a result of switch $S_1$ becoming superconducting as shown in FIG. 2f. The trapped current continues to flow in the storage loop comprising coil 1 and superconducting switch $S_2$. After a slight additional amount of counterclockwise rotation of the pick-up coil from the position shown in FIG. 3f to the position shown in FIG. 3g, switch $S_2$ changes from its superconducting (FIG. 1f) state to its normally conducting (FIG. 1g) state. This action causes the current which flowed in the superconducting storage loop in FIG. 1f to be rerouted through the newly formed superconducting loop comprising storage coil 1, switch $S_1$ and pick-up coil 2 as shown in FIG. 1g. The condition of the switches and the position of the pick-up coil relative to the magnetic field $B_e$ are restored to the initial relationships shown in FIG. 1a and FIG. 3a. The entire cycle of operation is then repeated.

During the next cycle, the relationships shown in FIG. 1b and FIG. 3b are reestablished and the incident magnetic field flux is expelled for the second time. The expulsion of the external field flux causes the stored current to increase from its value at the end of the first cycle (in the circuit of FIG. 1g) to a higher value to maintain the flux over the superconducting circuit constant. Assuming again that the amplitude of the incident magnetic field is 11 units of flux, the stored 10 units of flux (at the end of the first cycle) initially increases to a value of 21 units of flux. The 21 units of flux are apportioned between the storage coil and the pick-up coil so that 10 parts are associated with the storage coil and one part is associated with the pick-up coil, i.e., $10/11 \times 21$ flux units are associated with the storage coil and $1/11 \times 21$ flux units are associated with the pick-up coil. The pick-up coil flux is dissipated when the circuit configuration of FIG. 1d is reached during the second cycle of operation.

It can be seen that 10 units of net flux are stored during the first cycle of operation and $9\frac{1}{11}$ units of net flux are added during the second cycle. The step-like increases of the stored flux continues in like manner for each successive cycle of operation with each successive increase being less than the immediately preceding increase. Three successive increases are shown in FIG. 2. The process continues until a maximum limiting value of stored flux is reached at which time the flux discarded from the pick-up coil loop during each cycle equals the flux added at the start of each cycle. In the limit, the ratio of the maximum stored flux to the incident field flux ($B_e$) approaches $L_1/L_2$ wherein $L_1$ represents the inductance of the storage coil and $L_2$ represents the inductance of the pick-up coil. Thus, the maximum magnification factor of the flux magnifier of the present invention is determined by the ratio of the inductance of the storage coil to the ratio of the inductance of the pick-up coil.

The magnification factor increases with the number of completed cycles of operation until the limiting value is reached. For lesser numbers of completed cycles of operation, the magnification factor may be computed with the aid of the expression $$M_{(n)} = \frac{L_1}{L_2}\left[1 - \left(\frac{L_1}{L_1+L_2}\right)^n\right]$$

wherein $n$ represents the number of completed cycles of operation and $M_{(n)}$ represents the magnification factor resulting from $n$ completed cycles of operation.

Figure 4:
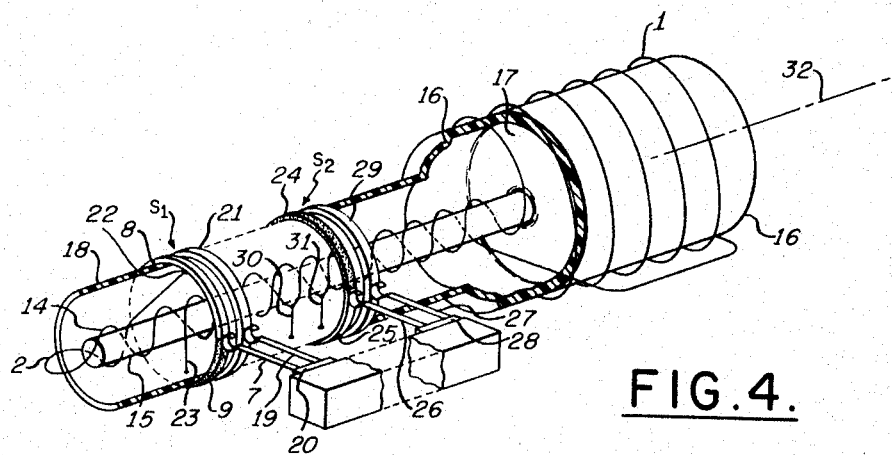
FIG. 4 is a simplified sketch of a rotating assembly comprising the pick-up and storage coils and the first and second switches employed in the preferred embodiment.

The simplified sketch of FIG. 4 shows a presently preferred rotating assembly comprising the pick-up and storage coils and switches discussed in connection with the schematic diagrams of FIGS. 1 and 3. Pick-up loop 2 may consist of, for example, 10 turns of 0.001 inch niobium wire wound into a solenoid having a diameter of 0.5 inch and a length of about 0.020 inch. A representative inductance for the pick-up loop is approximately 2 microhenrys. The leads 14 for connecting the pick-up coil 2 to the storage coil 1 preferably are bifilar wound about a plastic supporting rod 15 in order to reduce inductive pick-up in the leads 14 to a minimum. It is important that substantially all of the inductance present in the superconducting loops be concentrated in the pick-up coil 2 and storage coil 1. In a typical case, the leads 14 may comprise 0.001 inch diameter niobium wire. The storage loop 1 may consist of, for example, approximately 1000 turns of 0.001 inch diameter niobium wire wound with 0.001 inch spacing between adjacent turns about cylinder 16 to form a solenoid having a one inch diameter and a two inch length. A typical inductance for storage coil 1 is approximately 40 millihenrys. Rod 15 is supported at one end by plastic disc 17 which, in turn, is fixed to cylinder 16.

Switch $S_1$ is connected in series circuit with one of the leads 14. As previously discussed in connection with FIGS. 1 and 3, switch $S_1$ comprises a normally conducting portion 9 and a superconducting portion 8 of an annular commutator-type member. The member is mounted on supporting cylinder 18. Portion 9 consists of material such as copper which exhibits high resistance at temperatures of that of liquid helium. Portion 8, on the contrary, is of a material such as niobium which is superconducting at said temperatures. Switch $S_1$ further comprises superconducting wipers 7 and 19, superconducting connecting member 20 and superconducting slip ring 21. Ring 21, like the annular member consisting of portions 8 and 9, also is mounted on supporting cylinder 18. Cylinder 18 is attached at one end to cylinder 16. When wiper 7 is in contact with portion 8 of switch $S_1$, a superconducting connection is established between terminals 22 and 23 via portion 8, wipers 7 and 19, connector 20 and slip ring 21.

Switch $S_2$ is similar in structure to switch $S_1$. Switch $S_2$ comprises normally conducting portion 24 and superconducting portion 25 of an annular commutator-type member, superconducting wipers 26 and 27, superconducting connecting member 28 and superconducting slip ring 29. The annular member consisting of portions 24 and 25 as well as slip ring 29 are mounted on cylinder 18. A superconducting path is established between terminals 30 and 31 when wiper 26 is in connection with superconducting portion 25. The path includes portion 25, wipers 26 and 27, connecting member 28 and slip ring 29. It should be noted that terminals 30 and 31 are in shunt with leads 14 whereas terminals 22 and 23 are in series circuit with one of the leads 14. Thus, as the assembly of FIG. 4 is rotated about axis 32, the circuit configurations successively depicted in FIG. 1 are established for pick-up coil 2 and storage coil 1.

The manner in which the rotating assembly of FIG. 4 is employed in the preferred embodiment of the present invention will now be described with the aid of the simplified sketch of FIG. 5. The plastic cylinder 16 of the rotating assembly is directly attached at one end 54 to a superconducting shield 33 and is supported at the other end by an apertured disc 34 also secured to superconducting shield 33. Shield 33 is generally cylindrical in form and is guided for rotation about axis 32 by bearings 35, 36 and 55. Bearings 35, 36 and 55 may be conventional steel roller bearings which have been carefully degreased to eliminate lubricating films which become solids at the superconducting temperatures employed thereby preventing the free rotation of the assembly. Shield 33 is driven by shaft 37 via gears 38 and 39. A revolution counter 40, also driven by shaft 37 records the aggregate number of revolutions of pick-up coil 2. As disclosed earlier, the aggregate number of revolutions of pick-up coil 1 determines the flux magnification factor produced by the present invention.

A Dewar flask arrangement is provided for maintaining the necessary super-cooled temperature for the superconducting circuit elements. The flask assembly comprises a pair of doubled walled evacuated glass bottles 41 and 42. The space 43 between bottles 41 and 42 is filled with liquid nitrogen. The interior of glass bottle 42 is filled with liquid helium. Thus, the liquid helium surrounds pick-up coil 2, conducting leads 14, switch $S_1$, switch $S_2$ and storage coil 1 to maintain the superconducting portions thereof in substantially zero impedance condition.

Figure 5:
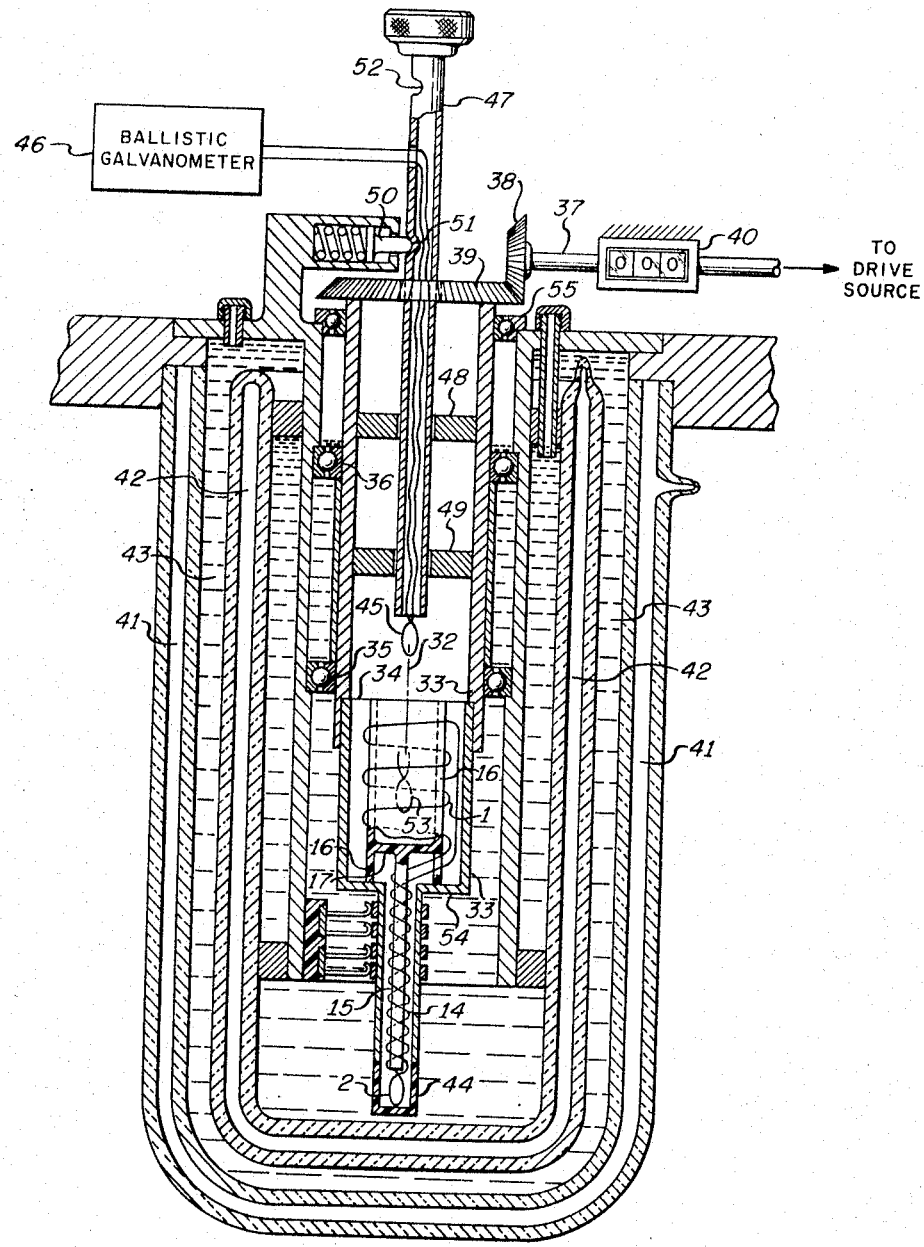
FIG. 5 is a simplified sketch of the preferred embodiment of the present invention incorporating the rotating assembly of FIG. 4.

Ballistic galvanometer means are provided in the preferred embodiment of FIG. 5 for measuring the magnified flux generated within storage coil 1. Sensing coil 45 of the ballistic galvanometer is supported by shaft 47. Shaft 47 is guided for translation along axis 32 by sleeves 48 and 49 and is held in either its fully advanced or fully withdrawn position by spring loaded ball 50 which engages detent 51 or 52. In the fully withdrawn position shown in FIG. 5, sensing coil 45 of ballistic galvanometer 46 is removed from the magnified flux field associated with storage coil 1.

After pick-up coil 2 of the flux magnifier has been rotated a desired number of times as indicated by counter 40 and it is desired to measure the magnified flux generated within storage coil 1 in response to the external field $B_e$, coil 45 of galvanometer 46 is advanced to the lowermost position 53. As is well understood, a ballistic galvanometer measures the total charge displaced in its sensing coil as a result of a change in flux engaging the sensing coil. The total displaced charge is proportional to the total flux change. Inasmuch as zero flux links coil 45 in the fully withdrawn position due to the presence of superconducting shield 33, the total flux change is equal to the magnified flux within storage coil 1. Accordingly, the galvanometer may be calibrated in terms of flux units so that the magnitude of input field $B_e$ may be determined. The sensitivity of the galvanometer for purposes of measuring the field $B_e$ is greatly enhanced by the flux magnification factor introduced by the present invention. The gain factor, in turn, may be controlled by the ratio of the inductance of the storage coil to the inductance of the pick-up coil and by controlling the number of complete revolutions of the pick-up coil.

The embodiment described in connection with FIG. 5 can be prepared for flux magnification operation by exposing the apparatus to the incident field $B_e$, rotating shaft 37 to the initial position shown in FIG. 3a for switches $S_1$ and $S_2$ and pick-up coil 2, and then filling the Dewar flask arrangement with liquid nitrogen and liquid helium. This sequence of steps insures that the incident magnetic field links the pick-up coil 2 before the circuit including switch $S_1$, pick-up coil 2 and storage coil 1 becomes superconductive. With the satisfaction of these initial conditions, shaft 37 may be rotated a given number of times corresponding to any desired magnification factor up to a maximum limiting magnification factor where the maximum magnification factor is determined by the ratio of the inductance of the storage coil to the inductance of the pick-up coil.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A flux magnifier comprising
   a storage coil which is superconducting at supercooled temperatures,
   a pick-up coil which is superconducting at supercooled temperatures,
   a first switch connected in series circuit with said storage and pick-up coils to form a closed circuit,
   a second switch connected to shunt with said storage coil,
   each of said first and second switches including a rotatable annular member having a first portion which is normally conducting at a supercooled temperature and a second portion which is superconducting at the same supercooled temperature,
   means for supercooling to said temperature said first and second switches and said storage and pick-up coils,
   actuable flux control means for admitting and expelling flux relative to said pick-up coil,
   and means for rotating said members to make said first and second switches normally conducting and superconducting in a predetermined sequence synchronous with the actuation of said flux control means.

2. A flux magnifier as defined in claim 1 and further comprising
   translatable means for measuring the flux within said storage coil.

3. A flux magnifier comprising
   a storage coil which is superconducting at supercooled temperatures,
   a rotatable pick-up loop which is superconducting at supercooled temperatures,
   means for rotating said pick-up loop,
   a first switch connected in series circuit with said storage coil and pick-up loop to form a closed circuit,
   a second switch connected in shunt with said storage coil,
   each of said first and second switches including a rotatable annular member having a first portion which is normally conducting at a supercooled temperature and a second portion which is superconducting at the same supercooled temperature,
   means for supercooling to said temperature said first and second switches, said storage coil and said pick-up loop,
   and means for rotating said members to make said first and second switches normally conducting and superconducting in a predetermined sequence synchronous with the rotation of said pick-up loop.

4. A flux magnifier as defined in claim 3 and further comprising
   translatable means for measuring the flux within said storage coil.

References Cited by the Examiner

UNITED STATES PATENTS 3,150,291   9/1964   Laquer _____ 317—123
3,244,943   4/1966   Hildebrant et al. ____ 317—158

OTHER REFERENCES

Hildebrant et al.: Some Experimental Consequences of Flux Conservation Within Multiply-Connected Superconductors, Journal of Applied Physics, vol. 33, No. 7, pp. 2375–2377, July 1962.

WALTER L. CARLSON, *Primary Examiner.*

R. J. CORCORAN, *Assistant Examiner.*